Jan. 12, 1960 S. TESZNER 2,921,265

VERY HIGH FREQUENCY FIELD-EFFECT TRANSISTORS

Filed July 26, 1957 4 Sheets-Sheet 1

INVENTOR
STANISLAS TESZNER
BY Abraham A. Saffitz
ATTORNEY

VERY HIGH FREQUENCY FIELD-EFFECT TRANSISTORS

INVENTOR
STANISLAS TESZNER
BY Abraham A. Saffitz
ATTORNEY

INVENTOR
STANISLAS TESZNER
BY Abraham A. Saffitz
ATTORNEY

INVENTOR
STANISLAS TESZNER
BY Abraham A. Saffitz
ATTORNEY 2,921,265

VERY HIGH FREQUENCY FIELD-EFFECT TRANSISTORS

Stanislas Teszner, Paris, France

Application July 26, 1957, Serial No. 674,387
Claims priority, application France August 2, 1956
11 Claims. (Cl. 330—38)

The present invention relates to field-effect transistors usable in the very high frequency range.

Field-effect transistors are already known, which are based on the principle of modulating a charge-carrying flow by means of a high-frequency transverse electric field. A preferable form of such a transistor has been described in my copending patent application, Ser. No. 565,231, filed February 13, 1956, which, by reason of the cylindrical shape of the conductive channel, offers many advantages as compared with the forms hitherto used or contemplated.

One of the features of this type of transistor is that of being utilisable in a wide frequency band and especially of rendering possible an amplification of signals of relatively high frequency with a suitable gain.

However, in the forms hitherto described including that of my copending application, there are troublesome limitations to the frequency band which can be used with these transistors, which limitations result essentially from the following two factors:

(1) The lumped capacity $C_e$ equivalent to the distributed capacity between the modulation gate electrode and the conductive channel and the lumped resistance $R_e$ equivalent to the channel resistance give a time constant $\tau_e=R_eC_e$. Consequently, the cut-off frequency is:

$$f_c=\frac{1}{2\pi R_eC_e} \quad (1)$$

(2) The transit time $\tau_t$ of the charge-carriers from one end to the other of the modulation gate electrode gives an absolute limiting frequency of use which is expressed by the following formula:

$$f_m=\frac{U}{L} \quad (2)$$

where U is the velocity of the charge-carriers and L is the length of the modulation gate electrode.

In practice, condition (1) is much more restrictive than condition (2) and gives a much lower frequency limit. It is therefore necessary, in the first place, to try to reduce the time constant $R_eC_e$. However, great difficulties arise in this way.

As a matter of fact, when the length of the modulation gate electrode is reduced, the longitudinal electric field in the channel rapidly exceeds the critical value from which the mobility of the charge carriers is no longer constant. The variation of this mobility $\mu$ is first proportional to $E^{-1/2}$ (where E is the intensity of the electric field) and finally tends towards a proportionality to $E^{-1}$, whence the necessity for the speed of the carriers not to exceed a limiting value which, for example, for electrons in germanium of the n type, is about $6.10^6$ cms. per second (experimental data of E. J. Ryder, Physical Review, June 1, 1953, pages 766 to 769). In this way, the resistivity of the channel first increases proportionally to $E^{1/2}$ and then to E. Finally, notwithstanding the reduction of the length of the modulation gate electrode, the resistance $R_e$ remains constant.

On the other hand, when the length of the modulation electrode becomes of the order of magnitude of half of the transverse dimension of the channel (i.e. of the order of magnitude of the radius in the case of a cylindrical configuration and of half the small side of the rectangular section in the case of a parallelepipedal configuration), the capacity $C_e$ no longer diminishes approximately proportionally to L, the effect of the edges of the electrode being expressed here by a parasitic capacity which becomes relatively greater and greater.

Finally, the shorter the modulation gate electrode, the more difficult it becomes to remove the heat produced by the energy dissipated in the channel.

One is therefore led to seek the solution in the reduction of the transverse dimension of the channel and a parallel increase of the conductivity of the semi-conductor used (for example, germanium or silicon). In this way, the length L can be reduced whilst, at the same time, benefitting by the reduction of $R_e$ and of $C_e$. On the other hand, the energy to be dissipated still remains within acceptable limits.

However, one then encounters increasing difficulties of construction and, finally, the practical limit of utilisation frequencies becomes of the order of 300 mc./s.

The object of the invention is to provide field-effect transistors, in which this frequency limit is reduced by from one to two orders of magnitude, by acting, at the same time, on the time constant $\tau_e$ and on the transit time $\tau_t$ which may then become equally troublesome. Thus, frequencies of the order of 10000 mc./s. can be reached.

The invention is based essentially on the principle of separation of the functions of the pinch-off of the channel and of its modulation. It is characterized by the existence of at least one auxiliary electrode surrounding the channel, in addition to the modulation gate electrode along a single-narrowed portion of the bulk of the semiconductive material, said auxiliary electrode being inserted between the electrode which emits the majority carriers and the gate.

The principle of the invention will be explained, its embodiments will be described and its remarkable advantages will be brought out, with reference to the accompanying drawings in which.

Figure 13:
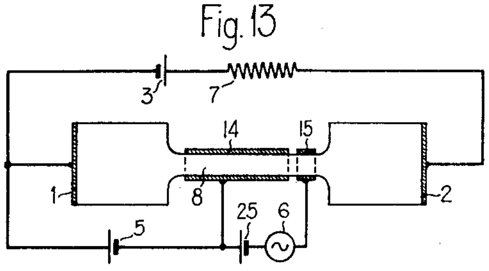
Figure 14:
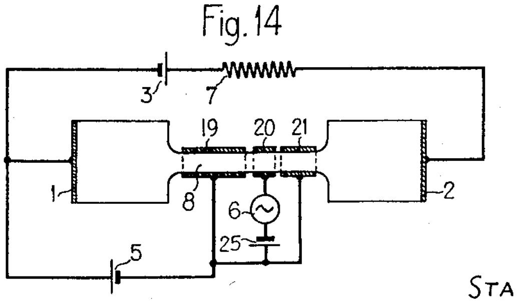
Figure 7:
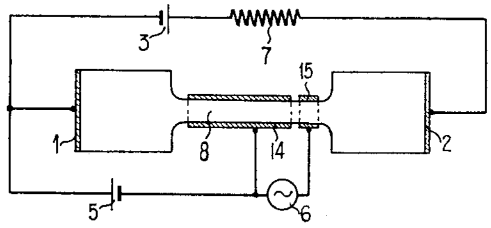
Fig. 7 represents diagrammatically a field-effect transistor with a double gate electrode according to the invention.
Figure 8:
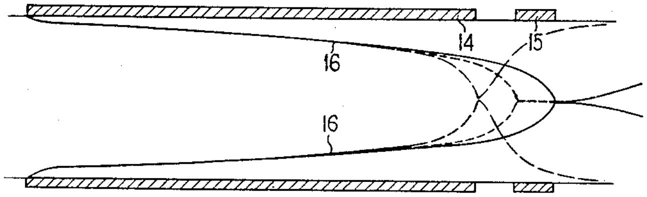
Figs. 8 and 9 show respectively the variation of the section of the conductive channel and the variation of its total resistance under the action of a signal to be amplified in the case of the transistor shown in Fig. 7.
Figure 9:
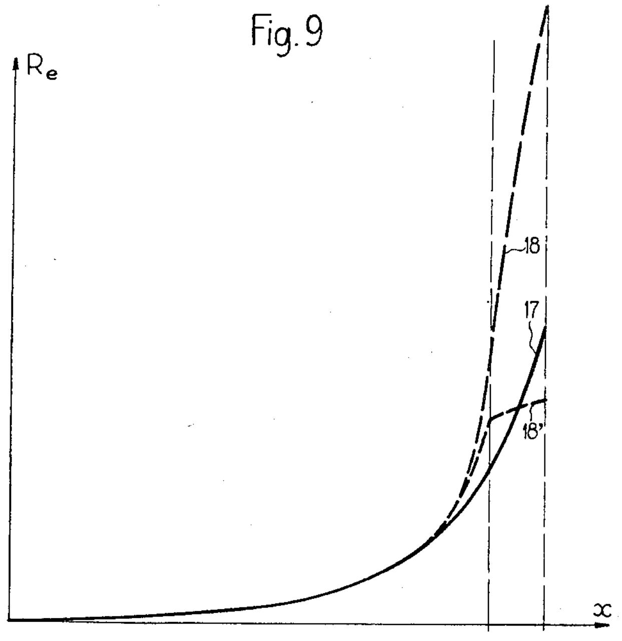
Figure 10:
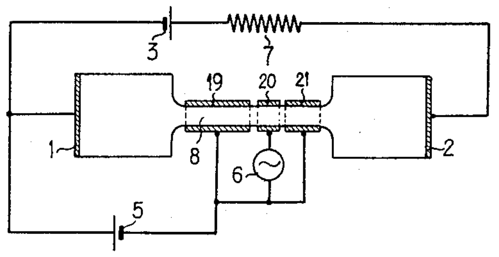
Figure 11:
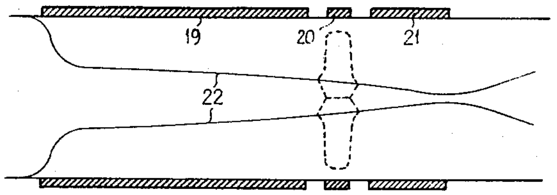
Figure 12:
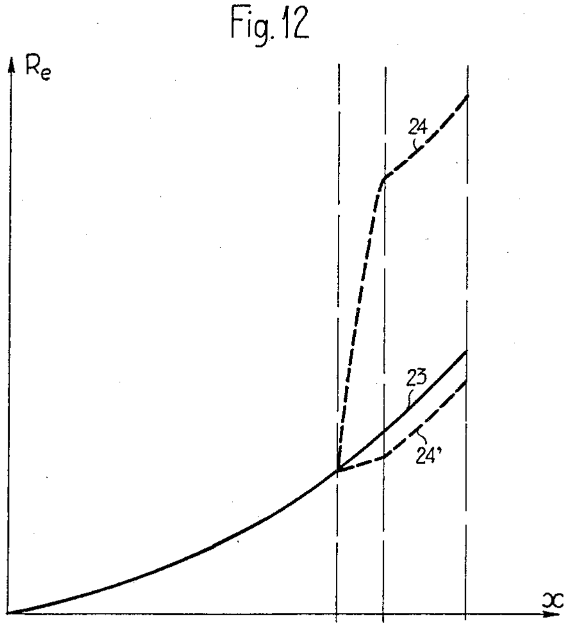

Figs. 10, 11 and 12 are figures corresponding respectively to Figs. 7, 8 and 9, in the case of a field-effect transistor with a triple gate electrode according to the invention; and Figs. 13 and 14 show optional transistor circuit diagrams for the two devices according to the invention, with respectively double and triple gate electrode.

Figure 1:
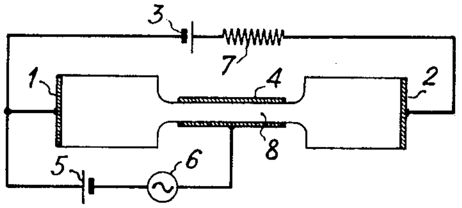
Figs. 1 and 2 represent the diagram of principle of a field-effect transistor amplifier and the equivalent circuit thereof.
Figure 2:
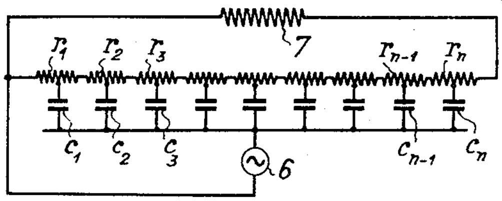

Fig. 1 refers to the electric diagram of a prior art field-effect transistor. Between two terminal electrodes 1 and 2, generally referred to as the source electrode and the drain electrode, there flows a current supplied by the current source 3. The modulation gate electrode 4, on which there act, at the same time, the bias source 5 and the signal produced by the generator 6, is an electrode arranged round the thinned portion 8 of the bulk of the semi-conductive body constituting the transistor. The amplified signal is available at the terminals of the load resistance 7. The polarities of the sources of current represented in Fig. 1 correspond to the case of a semi-conductor of the n type, for example, germanium of the n type. It is to be noted that for n-type germanium, the gate is negatively biased with respect to the semi-conductive body, i.e., the gate constitutes with the semi-conductive body a rectifying contact.

Although the modulation gate electrode and the auxiliary electrodes which will hereinafter be referred to, are not necessarily annular and should only surround the channel, it will be assumed, non-limitatively, that they have this shape.

The electric system equivalent to the field-effect transistor shown in Fig. 1, with respect to A.C. signals comprises distributed resistances $r_1, r_2 \ldots r_n$ representing the resistance of the channel, which is variable all along the latter, and distributed capacitors $c_1, c_2 \ldots c_n$ representing the capacity between the modulating electrode and the channel, which is also variable along the channel. This equivalent circuit can be simplified by reducing it, at a first approximation, to a single capacitor having a capacity $C_e$ equal to the full capacity between the modulating gate and the channel and located at the mid point of the length of the channel, and to a single resistance $R_e$ equal to half the resistance of an idealized channel having a constant section equal to the section at its mid point. Thus, this resistance $R_e$ is equal to the channel resistance for a zero modulation voltage since the section at the mid point of the channel for the pinch-off voltage is substantially equal to half the section at the origin of the channel (section for a zero modulation voltage). As the section at the middle of the channel for the pinch-off voltage is half the section at the origin of the channel, half the resistance of the idealized channel having this mid point section is quite equal to the resistance of the channel having the section at the origin.

Figure 3:
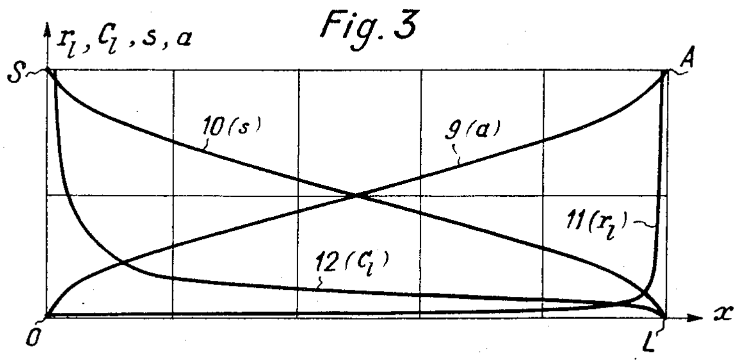
Figs. 3 and 4 show the variation, along the conductive channel, of its longitudinal profile and of its section, as well as of its linear resistance and of its linear capacity with respect to the gate electrode, for parallelepipedal and cylindrical configurations respectively.

Fig. 3 shows, in the case of a thinned portion 8 of a parallelepipedal shape and, consequently, in the case of a channel of rectangular section, the curve 9 giving the width $a$ of the zone occupied by space charges, the curve 10 giving the section $s$ of the channel, the curve 11 giving the linear resistance $r_l$ and the curve 12 giving the linear capacity $C_l$ as a function of the abscissa $x$ of a point in the channel. These curves correspond to the case in which there is applied, between the terminal electrodes 1 and 2, a voltage $V_o$ giving the complete pinch-off and in which the bias voltage of the gate is zero. A represents half of the small side of the rectangle which bounds the channel at the entrance into the modulation gate electrode, L represents the total length of the channel and S represents its total section at the origin.

Figure 4:
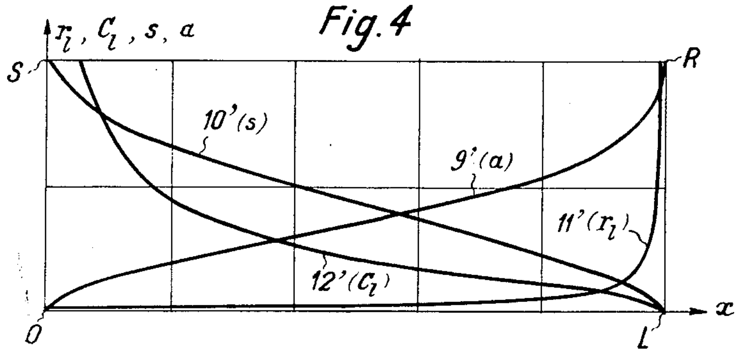

Fig. 4 is similar to Fig. 3 but shows the case in which the thinned portion 8 of the transistor has a cylindrical shape of a radius R. The curve 9′ gives the radial dimension $a$ of the zone occupied by space charges, the curve 10′ gives the section $s$ of the channel, the curve 11′ gives the linear resistance $r_l$ and the curve 12′ gives the linear capacity $C_l$. As in the case of Fig. 3, S denotes the total section of the channel at the origin.

Figure 5:
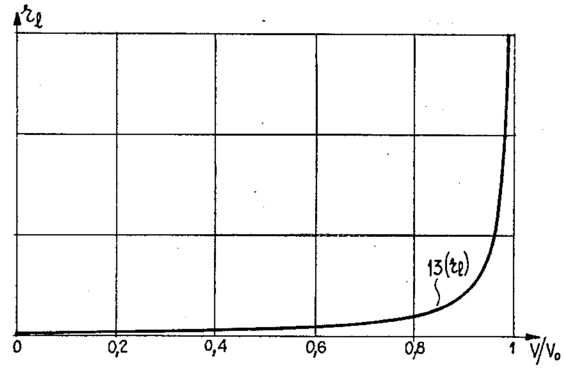
Figs. 5 and 6 show, for these two configurations, the variation of the linear resistance of the channel as a function of the potential difference between the latter and the modulation gate electrode.
Figure 6:
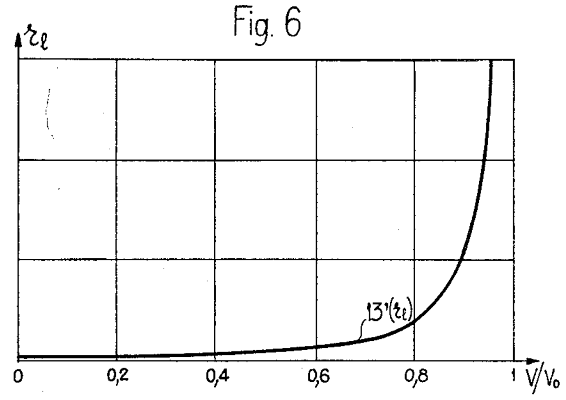

Fig. 5 represents a curve 13 which gives, in the case of the rectangular section of the channel, the linear resistance $r_l$ as a function of the voltage V that is applied between the drain 2 and the modulation gate electrode 4, $V_o$ being the voltage corresponding to the pinch-off. Fig. 6 represents a curve 13′ relating to the case of the circular section of the channel.

The modulating effect of the signal to be amplified on the section of the channel is effectively exerted only on a small portion and, in particular, on the narrowest portion of the channel, on which the voltage applied is nearly $V_o$. To account for this, it is sufficient to note the peculiar shape of the curve 11 or 11′ giving $r_l$ as a function of $x$ and to refer to Figs. 5 and 6 giving the variation of the linear resistance of the channel as a function of the applied voltage and consequently as a function of the transverse electric field.

However, it is the total capacity of the channel with respect to the modulation gate electrode which comes into the time constant $R_eC_e$. Now, it is observed in Figs. 3 and 4 (curves 12 and 12′) that the linear capacity $C_l$ is greater the less narrow the section of the channel; it is thus seen that the time constant $R_eC_e$ is due, for the greater part, to the portion of the electrode on which the modulating effect of the signal to be amplified is practically negligible.

This portion of the electrode is, nevertheless, indispensable for bringing the channel to a pinch-off state which renders possible an effective action of the signal, but it appears to be quite superfluous for the latter to be applied there. The idea of the invention consists in eliminating this useless effect, whilst eliminating, at the same time, the parasitic capacity which results therefrom. At the same time, the time of transit is considerably reduced.

Fig. 7 shows diagrammatically a unipolar transistor, according to the invention, which renders it possible to attain the object aimed at (as in Fig. 1, the polarities of the sources correspond to the case of an n type semi-conductor). The annular modulation gate electrode is divided into two parts 14 and 15 which pinch off the channel respectively fixedly and variably. In order that the channel not be allowed to diverge after having been pinched off, the parts 14 and 15 are juxtaposed along the same narrowed portion 8. Gaps are provided between the edges of the rings 14 and 15 and the transverse walls which laterally limit the narrowed portion. These provisions are essential in order to obtain very high operative frequencies and if these were not taken, i.e., if parts 14 and 15 were to be located in two distinct narrowed portions next to one another in the bulk of the semi-conductive body or if, being located in the same narrowed portion of the bulk, they would come into contact with the transverse lateral walls of said portion, then the space charge region would comprise a generally ring shaped longitudinal portion delimitating a filament-like conductive channel and a plane transverse portion against the lateral walls of the narrowed portion.

As more fully explained in my copending application above referred to, the space charge extension corresponding to a given potential of the gate is smaller for a plane structure of the gate than for a generally cylindrical structure, the ratio of the extensions in the two cases being approximately $\sqrt{2}$. Thus, a stray capacitance would be added to the unavoidable capacitance between the gate and the filament-like conductive channel, and said stray capacitance would be the largest part of the total capacitance. In this way, therefore, any approach of very high frequency operation is not possible. The longer of the two parts, namely the "upstream" part 14, plays a part similar to that of a lens which concentrates a beam of charge-carriers. It will hereinafter be called "upstream" lens electrode (the direction reckoned according to the displacement of the electrons) in order to differentiate it from the "downstream" lens electrode which will be referred to hereinafter. The other part 15, which is clearly the shorter, plays the part of a diaphragm or gate, the effect of which is exerted on the channel after the pinch-off of the latter; the modulating effect on the resistance of the channel may thus be great, notwithstanding the small length of the portion concerned. It is only the gate 15 which is subjected to the voltage of the signal source 6, the lens 14 being only subject to the bias voltage of the current source 5. The other notations are the same as those in Fig. 1.

Fig. 8 illustrates the action of the device, the bias voltage of the current source 5 being supposed to be zero. The gate 15 acts on the channel 16 after the pinch-off of the latter obtained by the upstream lens electrode 14. The limits of variation of the profile of the channel under the action of the modulation voltage applied to the gate 15 are represented by broken lines by way of indication.

Fig. 9 represents the corresponding variation of the resistance of the channel. The full-line curve 17 represents the total resistance $R_e$ of the channel as a function of the abscissa $x$, the gate 15 being at the same voltage as that of the electrode 14. The curves 18 and 18' represent the limits between which this resistance may vary under the action of the modulating voltage applied to the gate 15.

The voltage of the signal is applied between the gate and the lens; it is thus distributed between the gate-channel capacity and the lens electrode-channel capacity. However, since the latter capacity is much greater than the former, almost the whole of this voltage exerts its effect upon the gate-channel space.

As a matter of fact, the length of the gate is only a small fraction, which is normally less than one tenth, of that of the lens. The field produced by the gate is defiintely bounded upstream by the lens like by a guard ring; on the other hand, downstream, a portion of the channel which overlaps the contour of the gate owing to the edge effect is acted upon by the field. Thus, the effective capacity of the gate with respect to the channel, whilst remaining very small, is rather appreciably increased by this parasitic effect.

According to the invention, this drawback is remedied by a double-lens device shown in Fig. 10. The upstream lens 19 and the downstream lens 21 are connected together in parallel and combine their effects to render the profile of the channel particularly sensitive to the action of the gate. On the other hand, they play, with respect to the latter, the part of a guard ring, suitably bounding the pattern of the electric field of the gate and reducing the parasitic capacity practically to the minimum.

Finally, another advantage results, namely that the equivalent resistance $R_e$ which occurs in the time constant $\tau_e$ is itself considerably diminished. In fact, it is immediately observed that the electric circuit on which the signal acts is composed of two branches in parallel, each comprising a resistance $R_e/2$, from which it follows that the resulting resistance is of the order of $R_e/4$.

In the embodiment of Fig. 11, the effect of the gate is no longer exerted at the pinch-off of the channel, but in an intermediate region. In order to set off the modulating effect and to ensure the complete effectiveness of the modulation, it is of advantage that, in this region, the channel should have already previously been brought to a small section and preferably without there being, beyond it, a zone of full pinch-off. This profile is obtained by using a considerable bias voltage and an anode voltage which is definitely less than the complete pinch-off voltage.

On the other hand, there will be an advantage in having the length of the downstream lens 21 substantially less than that of the upstream lens 19 while remaining considerably greater than the length of the gate 20: a numerical example that fixes one's ideas will hereinafter be given. This distributor of the lenses is, moreover, favourable for effecting a division, into almost equal parts, of the resistance of the channel on one side and the other of the gate, giving a minimum value at the resulting resistance.

Fig. 11 shows, in full lines, the image of the channel 22 in the case considered and, in broken lines, the image of the effect of the gate, which is represented by a localized contraction or a widening.

Fig. 12 represents, by way of indication, a curve 23 which gives the total resistance as a function of the abscissa $x$, the gate 20 being at the same voltage as that of the electrodes 19 and 21, and curves 24 and 24' which represent the limits between which this resistance may vary under the effect of the modulating voltage applied to the gate 20.

It is obvious that the point of operation of the gate in the zone between the curves 24 and 24' or between the curves 18 and 18' can be displaced as desired by means of a slight biasing of the gate, both for a single-lens transistor and for a double-lens transistor. The corresponding diagrams are given in Fig. 13 for the first case and in Fig. 14 for the second case, the bias source of the gate being denoted by 25.

In order to fix one's ideas, there will hereinafter be given, simply by way of indication, a numerical example of the construction of a single-lens transistor and of the construction of a double-lens transistor, both of cylindrical configuration.

Constituting material: germanium of the type n, with $N=1.6\times10^{14}$ per cubic centimeter; $\rho$ (resistivity) $\approx 10$ ohm-centimeters.

Diameter of the neck (thinned part) $\phi=6\times10^{-3}$ cm., from which $V_0$ (voltage corresponding to the complete pinch-off of the channel) $\approx 40$ volts.

In the case of a single-lens device:

Length of the lens-electrode: $1.5\times10^{-2}$ cm.

Length of the gate-electrode: $5\times10^{-4}$ cm.

Distance between these two electrodes: $10^{-3}$ cm.

In the case of a double-lens device:

Length of the upstream lens-electrode: $10^{-2}$ cm.

Length of the gate-electrode: $5\times10^{-4}$ cm.

Length of the downstream lens-electrode: $5\times10^{-3}$ cm.

Distance between the gate and each lens: $10^{-3}$ cm.

The limiting frequencies used can be calculated a priori chiefly for the double-lens device, where the capacity of the gate is definitely bounded.

In the case of the single-lens transistor:

The signal is applied between the gate and the lens and it may be assumed to be applied between the mid-point of the gate and the mid-point of the lens. The resistance $R_e$ between these two points comprises in series half the resistance of the channel under the gate (resistance between the mid-point and the left end of the gate) and half the resistance of the channel under the lens (resistance between the mid-point and the right end of the lens). These two terms are of the same order of magnitude. By referring to Fig. 8 of my above-mentioned application which gives the drain current $I_d$ of a unipolar transistor of the prior art in terms of the drain voltage $V_d$ for several gate voltages $V_g$, it is seen that for $V_g=0$ and $V_d=+40$ volts the value of $I_d$ is 1.25 milliamperes. Then the resistance of the channel under the gate and under the lens is $$\frac{40\times10^3}{1.25}=32000 \text{ ohms}$$

The half-resistances are each 16000 ohms and the two half-resistances in series give $R_e=32000$ ohms.

The gate-channel capacity is determined as follows:

The ratio of the diameters of the gate and of the channel under the gate is of the order of 5 (see Figs. 4 and 8). The effective length of the gate-electrode may be taken as equal to the order of magnitude of three times its geometrical dimension. From this, the equivalent capacity is $$C_e=\frac{3.5\times10^{-4}\times16}{2\log_e 5\times9\times10^{-1}}\approx 8.4\times10^{-3} \text{ picofarads}$$

Finally, it is found that the frequency limit resulting from the time constant $\tau_e$ is equal to $$f_c=\frac{1}{2\pi\times 32\times 10^3\times 8.4\times 10^{-15}}\approx 600 \text{ mc./s.}$$

Now, the corresponding limit for a transistor with a single modulation gate electrode of the same total length is of the order of 50 mc./s. It is thus seen that the gain obtained is of one order of magnitude.

It is to be noted that the frequency limit resulting from the time of transit $\tau_t$ is here appreciably greater. In fact, since the velocity U of the electrons under the gate for the mean field developed of the order of 2600 volts per centimeter is about $5.10^6$ cms. per second (according to E. J. Ryder's data loc. cit.), $$\tau_t\approx\frac{3L}{U}=\frac{15\times 10^{-4}}{5\times 10^6}=3\times 10^{-10} \text{ sec.}$$

From this $f_m=3300$ mc./s.

However, the conditions become still more favourable in the case of the double-lens device. As hereinbefore indicated, the transistor here should be made to operate under a "source-drain" voltage $V_d$ which is less than $V_o$ and with a relatively large bias voltage $V_g$. It will be assumed that $V_d=+25$ volts and $V_g=+6$ volts.

The signal is applied between the gate and the two lenses and it may be assumed to be applied between the mid-point of the gate and the mid-points of the two lenses in parallel. The resistance $R_e$ comprises half the resistance of the channel under the gate plus half the resistance of the channel under the upstream lens, in parallel with half the resistance of the channel under the gate plus half the resistance of the channel under the downstream lens. These four half resistances are, as already said, of the same order of magnitude and the resistance $R_e$ is therefore equal to the fourth of their common value. The same Fig. 8 of my abovementioned application shows that for $V_d=+25$ volts and $V_g=-6$ volts, the value of $I_d$ is 0.625 milliampere. The resistance of the channel is thus $$\frac{25\times 10^3}{0.625}=4000 \text{ ohms}$$

and the resistance $R_e$ is 10000 ohms.

On the other hand, it may be admitted that the capacity is limited substantially to the length of the electrode; from this $$C_e\approx 2.8\times 10^{-3} \text{ pf.}$$

i.e. the third part of the value of $C_e$ in the case of one lens only.

It follows that the limiting frequency resulting from the time constant $\tau_e$ becomes $$f_e=5.500 \text{ mc./s.}$$

i.e. a fresh gain of one order of magnitude.

Of course, owing to the reduction of the effective length of the gate, the frequency limit resulting from the transit time is also raised, although the mean velocity U of electrons is here only about $4.2\times 10^6$ cms. per second (by reason of a weaker electric field). In fact, a value:

$$f_m=\frac{U}{L}\approx\frac{4.2\times 10^6}{5\times 10^{-4}}=8400 \text{ mc./s.}$$

is found.

It is seen that the two limits now become substantially of the same order of magnitude.

In the example considered, the output power is relatively low. In fact, the power dissipated in the transistor would only be of the order of 10 mw. and the high-frequency power would be of the order of 1 mw. However, this power may be greatly increased by using germanium of less resistivity. In particular, by taking germanium of $\rho=3$ ohm centimeters ($N=5.5\times 10^{14}$ per cubic centimeter), the operating drain voltage then being brought to $V_d=+80$ volts, with $V_g=-20$ volts, the dissipated power will reach 150 mw. and the high-frequency power about 15 mw. It is to be noted that the increase of the power is moderated because the velocity of electrons here reaches the permissible maximum of $6\times 10^6$ cms. per second. Parallelly, the frequency limit is again increased: that due to $\tau_e$ becomes 8000 mc./s. and that due to $\tau_t$ becomes 12000 mc./s. It is noteworthy that this increase of the limiting frequency of use operates here not to the detriment but to the advantage of the output voltage.

Finally, by reducing the diameter of the thinned portion down to a diameter, which is again easily obtainable, of $5\times 10^{-3}$ cm. and by using germanium having a resistivity of 2 ohm centimeters ($N\approx 8.5\times 10^{14}$ per cubic centimeter), the operating and biasing voltages being the same as hereinafter mentioned, a leveling (at the upper level) of the two frequency limits is obtained. In fact, $f_e\approx f_m\approx 12000$ mc./s. is found, the output power remaining unchanged.

Of course, steps should be taken for removing the heat resulting from the power dissipated in the transistor, especially by means of suitably placed radiators. On the other hand, it should be recalled that as many transistors as are necessary to obtain the desired output power may be placed in parallel, without lowering the limiting frequency of use.

On the contrary, it is then possible, by freeing oneself from the limitations relating to the unitary output power, to reduce the length of the gate still further, in particular to 2 or $3\times 10^{-4}$ cm., the frequency limit thus becoming of the order of 20000 to 30000 mc./s.

The invention is applicable to all constructions of transistors in which the section of the conductive channel is modulated by a transverse field, either by an n–p junction, or by a barrier layer formed in the semi-conductor under a metallic electrode or through an insulating layer, whatever be the geometric configuration of the transistor.

In the case of a transistor with cylindrical channel and gate, the process of manufacture is as follows, reference being made to my copending application:

(1.) The neck is produced by a jet of electrolyte through a first nozzle on a small rod of semi-conductor (germanium, for example) driven with a rotary movement. Once the neck is obtained there is produced by a jet, by means of a second nozzle, the galvanoplastic deposit (of indium, for example) representing the upstream lens. By a consecutive polishing jet by means of a third nozzle, the length of this electrode is limited exactly.

(2.) This having been done, the second nozzle used for the galvanoplastic deposit is displaced in such a manner as to form a second electrode as near as possible to the first. Then, by a consecutive polishing by means of the third nozzle, its length is reduced to that required for the gate; in addition, the gap separating the gate from the lens is cleaned.

The device according to Fig. 7 has thus been practically produced. In order to produce a device according to Fig. 10, it is sufficient to repeat the operation referred to in (2.), for depositing the downstream lens electrode, while limiting the length of the latter to the required length.

In the two cases, the operation is terminated by placing the whole on a support, soldering the connections of the end and intermediate electrodes and enclosing the whole in an airtight hood.

It is to be understood that, in addition to n type germanium referred to by way of example, other semiconductors may be used for producing the transistors according to the invention, in particular: p type germanium, n type or p type silicon, and the intermetallic compounds of groups III and V of the periodic classification such as, for example, indium-antimony, indium-phosphorus, gallium-arsenic, aluminum-antimony, etc.

What I claim is:

1. A unipolar field effect transistor amplifier comprising a rod of an n-type semi-conductive body, metallic layers deposited on the end faces of said rod, having ohmic contact therewith and forming the source and drain electrodes of the transistor amplifier, said rod comprising a single thinned cylindrical portion near the center of the rod having a circular cross-section and limited by first and second transverse lateral walls with respect to the bulk of the rod, a first metallic layer forming a gate electrode surrounding said single thinned cylindrical portion, having a rectifier contact therewith and provided with a gap with respect to the first lateral wall of said thinned portion, at least a second metallic layer forming a lens electrode surrounding said single thinned cylindrical portion, having a rectifier contact therewith, said lens electrode being located between the gate electrode and the source electrode and provided with gaps with respect to the second lateral wall of said thinned portion and to said gate electrode, a lens circuit connected between said source electrode and the lens electrode comprising a bias voltage source which brings said lens to a negative potential with respect to the source electrode, a gate circuit connected between said lens electrode and the gate electrode comprising at least a source of input signal, and a drain circuit connected between said source electrode and the drain electrode comprising a feed voltage source which brings the drain electrode to a positive potential with respect to the source electrode and an output load.

2. A unipolar field effect transistor amplifier comprising a rod of a n-type semi-conductive body, metallic layers deposited on the end faces of said rod, having ohmic contact therewith and forming the source and drain electrodes of the transistor amplifier, said rod comprising a single thinned cylindrical portion near the center of the rod having a circular cross-section and limited by transverse lateral walls with respect to the bulk of the rod, a first metallic layer forming a gate electrode surrounding said single thinned cylindrical portion and having a rectifier contact therewith, second and third metallic layers surrounding said single thinned cylindrical portion, forming a lens electrode system comprising upstream and downstream lenses on one side and the other of the gate electrode, having a rectifier contact with the thinned cylindrical portion, said upstream and downstream lenses being provided with gaps with respect to said lateral walls and to said gate electrode, a lens circuit connected between said source electrode and the upstream and downstream lens electrodes in parallel comprising a bias voltage source which brings said lens electrodes to a negative potential with respect to the source electrode, a gate circuit connected between said upstream and downstream lens electrodes in parallel and the gate electrode comprising at least a source of input signal, and a drain circuit connected between said source electrode and the drain electrode comprising a feed voltage source which brings the drain electrode to a positive potential with respect to the source electrode and an output load.

3. A unipolar field effect transistor amplifier comprising a rod of a n-type semi-conductive body, metallic layers deposited on the end faces of said rod, having ohmic contact therewith and forming the source and drain electrodes of the transistor amplifier, said rod comprising a single thinned cylindrical portion near the center of the rod having a circular cross-section and limited by first and second transverse lateral walls with respect to the bulk of the rod, a first metallic layer forming a gate electrode surrounding said single thinned cylindrical portion, having a rectifier contact therewith and provided with a gap with respect to the first lateral wall of said thinned portion, at least a second metallic layer forming a lens electrode surrounding said single thinned cylindrical portion, having a rectifier contact therewith, said lens electrode being located between the gate electrode and the source electrode and provided with gaps with respect to the second lateral wall of said thinned portion and to said gate electrode, a lens circuit connected between said source electrode and the lens electrode comprising a bias voltage source which brings said lens to a negative potential with respect to the source electrode, a gate circuit connected between said lens electrode and the gate electrode comprising a source of input signal and a bias voltage source which brings the gate electrode to a negative potential with respect to the lens, and a drain circuit connected between said source electrode and the drain electrode comprising a feed voltage source which brings the drain electrode to a positive potential with respect to the source electrode and an output load.

4. A unipolar field effect transistor amplifier comprising a rod of a n-type semi-conductive body, metallic layers deposited on the end faces of said rod, having ohmic contact therewith and forming the source and drain electrodes of the transistor amplifier, said rod comprising a single thinned cylindrical portion near the center of the rod having a circular cross-section and limited by transverse lateral walls with respect to the bulk of the rod, a first metallic layer forming a gate electrode surrounding said single thinned cylindrical portion and having a rectifier contact therewith, second and third metallic layers surrounding said single thinned cylindrical portion, forming a lens electrode system comprising upstream and downstream lenses on one side and the other of the gate electrode, having a rectifier contact with the thinned cylindrical portion, said upstream and downstream lenses being provided with gaps with respect to said lateral walls and to said gate electrode, a lens circuit connected between said source electrode and the upstream and downstream lens electrodes in parallel comprising a bias voltage source which brings said lens electrodes to a negative potential with respect to the source electrode, a gate circuit connected between said upstream and downstream lens electrodes in parallel and the gate electrode comprising a source of input signal and a bias voltage source which brings the gate electrode to a negative potential with respect to the lens system, and a drain circuit connected between said source electrode and the drain electrode comprising a feed voltage source which brings the drain electrode to a positive potential with respect to the source electrode and an output load.

5. A unipolar field effect transistor amplifier comprising a rod of a p-type semi-conductive body, metallic layers deposited on the end faces of said rod, having ohmic contact therewith and forming the source and drain electrodes of the transistor amplifier, said rod comprising a single thinned cylindrical portion near the center of the rod having a circular cross-section and limited by first and second transverse lateral walls with respect to the bulk of the rod, a first metallic layer forming a gate electrode surrounding said single thinned cylindrical portion, having a rectifier contact therewith and provided with a gap with respect to the first lateral wall of said thinned portion, at least a second metallic layer forming a lens electrode surrounding said single thinned cylindrical portion, having a rectifier contact therewith, said lens electrode being located between the gate electrode and the source electrode and provided with gaps with respect to the second lateral wall of said thinned portion and to said gate electrode, a lens circuit connected between said source electrode and the lens electrode comprising a bias voltage source which brings said lens to a positive potential with respect to the source electrode, a gate circuit connected between said lens electrode and the gate electrode comprising at least a source of input signal, and a drain circuit connected between said source electrode and the drain electrode comprising a feed voltage source which brings the drain electrode to a negative potential with respect to the source electrode and an output load.

6. A unipolar field effect transistor amplifier comprising a rod of a p-type semi-conductive body, metallic layers deposited on the end faces of said rod, having ohmic contact therewith and forming the source and drain electrodes of the transistor amplifier, said rod comprising a single thinned cylindrical portion near the center of the rod having a circular cross-section and limited by transverse lateral walls with respect to the bulk of the rod, a first metallic layer forming a gate electrode surrounding said single thinned cylindrical portion and having a rectifier contact therewith, second and third metallic layers surrounding said single thinned cylindrical portion, forming a lens electrode system comprising upstream and downstream lenses on one side and the other of the gate electrode, having a rectifier contact with the thinned cylindrical portion, said upstream and downstream lenses being provided with gaps with respect to said lateral walls and to said gate electrode, a lens circuit connected between said source electrode and the upstream and downstream lens electrodes in parallel comprising a bias voltage source which brings said lens electrodes to a positive potential with respect to the source electrode, a gate circuit connected between said upstream and downstream lens electrodes in parallel and the gate electrode comprising at least a source of input signal, and a drain circuit connected between said source electrode and the drain electrode comprising a feed voltage source which brings the drain electrode to a negative potential with respect to the source electrode and an output load.

7. A unipolar field effect transistor amplifier comprising a rod of a p-type semi-conductive body, metallic layers deposited on the end faces of said rod, having ohmic contact therewith and forming the source and drain electrodes of the transistor amplifier, said rod comprising a single thinned cylindrical portion near the center of the rod having a circular cross-section and limited by first and second transverse lateral walls with respect to the bulk of the rod, a first metallic layer forming a gate electrode surrounding said single thinned cylindrical portion, having a rectifier contact therewith and provided with a gap with respect to the first lateral wall of said thinned portion, at least a second metallic layer forming a lens electrode surrounding said single thinned cylindrical portion, having a rectifier contact therewith, said lens electrode being located between the gate electrode and the source electrode and provided with gaps with respect to the second lateral wall of said thinned portion and to said gate electrode, a lens circuit connected between said source electrode and the lens electrode comprising a bias voltage source which brings said lens to a positive potential with respect to the source electrode, a gate circuit connected between said lens electrode and the gate electrode comprising a source of input signal and a bias voltage source which brings the gate electrode to a positive potential with respect to the lens, and a drain circuit connected between said source electrode and the drain electrode comprising a feed voltage source which brings the drain electrode to a negative potential with respect to the source electrode and an output load.

8. A unipolar field effect transistor amplifier comprising a rod of a p-type semi-conductive body, metallic layers deposited on the end faces of said rod, having ohmic contact therewith and forming the source and drain electrodes of the transistor amplifier, said rod comprising a single thinned cylindrical portion near the center of the rod having a circular cross-section and limited by transverse lateral walls with respect to the bulk of the rod, a first metallic layer forming a gate electrode surrounding said single thinned cylindrical portion and having a rectifier contact therewith, second and third metallic layers surrounding said single thinned cylindrical portion, forming a lens electrode system comprising upstream and downstream lenses on one side and the other of the gate electrode, having a rectifier contact with the thinned cylindrical portion, said upstream and downstream lenses being provided with gaps with respect to said lateral walls and to said gate electrode, a lens circuit connected between said source electrode and the upstream and downstream lens electrodes in parallel comprising a bias voltage source which brings said lens electrodes to a positive potential with respect to the source electrode, a gate circuit connected between said upstream and downstream lens electrodes in parallel and the gate electrode comprising a source of input signal and a bias voltage source which brings the gate electrode to a positive potential with respect to the lens system, and a drain circuit connected between said source electrode and the drain electrode comprising a feed voltage source which brings the drain electrode to a negative potential with respect to the source electrode and an output load.

9. A field-effect transistor comprising a rod of semiconductive body, a first ohmic contact on one end face of said rod for emitting majority carriers, a second ohmic contact on the other end face of said rod for attracting said majority carriers, said rod comprising a single thinned cylindrical portion forming a channel region limited by transverse lateral walls with respect to the bulk of the rod, a principal gate around said channel region forming a principal gate region, at least an auxiliary gate around said channel region located between said first ohmic contact and said principal gate, gaps between said principal and auxiliary gates and between said gates and said lateral walls, means to apply a constant potential to said auxiliary gate whereby an effective channel already pinched-off in the principal gate region is formed and means to apply a signal potential to said principal gate.

10. A field-effect transistor comprising a rod of semiconductive body, a first ohmic contact on one end face of said rod for emitting majority carriers, a second ohmic contact on the other end face of said rod for attracting said majority carriers said rod comprising a single thinned cylindrical portion forming a channel region limited by transverse lateral walls with respect to the bulk of the rod, a principal gate around said channel region forming a principal gate region, two auxiliary gates around said channel region located on both sides of said principal gate which are connected in parallel, gaps between said principal and auxiliary gates and between said auxiliary gates and said lateral walls, means to apply a constant potential to said auxiliary gates connected in parallel whereby an effective channel already pinched-off in the principal gate region is formed and the edge effect capacitance between said principal gate and said channel is substantially decreased and means to apply a signal potential to said principal gate.

11. A field-effect transistor comprising a rod of semiconductive body, a first ohmic contact on one end face of said rod for emitting majority carriers, a second ohmic contact on the other end face of said rod for attracting said majority carriers, said rod comprising a single thinned cylindrical portion forming a channel region limited by transverse lateral walls with respect to the bulk of the rod, a principal gate around said channel region forming a principal gate region and having a given length along the channel region, first and second auxiliary gates around said channel region located respectively between said principal gate and said first ohmic contact and between said principal gate and said second ohmic contact which are connected in parallel, said first auxiliary gate having a length substantially larger along the channel region than the principal gate and said second auxiliary gate having a length along the channel region comprised between the length of the principal gate and the length of the first auxiliary gate, gaps between said principal and auxiliary gates and between said auxiliary gates and said lateral walls, means to apply a constant potential to said auxiliary gates connected in parallel whereby an effective channel already pinched-off in the principal gate region is formed and the edge effect capacitance between said principal gate and said channel is substantially decreased and means to apply a signal potential to said principal gate.

References Cited in the file of this patent

UNITED STATES PATENTS

| | | |
|---|---|---|
| 2,648,805 | Spenke | Aug. 11, 1953 |
| 2,805,397 | Ross | Sept. 3, 1957 |
| 2,836,797 | Ozarow | May 27, 1958 |